(12) United States Patent
Albrigtsen et al.

(10) Patent No.: US 10,946,938 B2
(45) Date of Patent: Mar. 16, 2021

(54) COUPLING SYSTEM FOR TRANSFER OF HYDROCARBONS AT OPEN SEA

(71) Applicant: MacGregor Norway AS, Kristiansand (NO)

(72) Inventors: Rolf Albrigtsen, Grimstad (NO); Lars Aaness, Arendal (NO); Stig André Nygaard, Arendal (NO); Jon Høvik, Færvik (NO)

(73) Assignee: MacGregor Norway AS, Kristiansand (NO)

( * ) Notice: Subject to any disclaimer, the term of this patent is extended or adjusted under 35 U.S.C. 154(b) by 56 days.

(21) Appl. No.: 16/318,337

(22) PCT Filed: Jul. 14, 2017

(86) PCT No.: PCT/EP2017/067914
§ 371 (c)(1),
(2) Date: Jan. 16, 2019

(87) PCT Pub. No.: WO2018/015311
PCT Pub. Date: Jan. 25, 2018

(65) Prior Publication Data
US 2019/0283844 A1    Sep. 19, 2019

(30) Foreign Application Priority Data

Jul. 18, 2016  (NO) .................................. 20161187

(51) Int. Cl.
*B63B 27/34*    (2006.01)
*B63B 27/30*    (2006.01)
(Continued)

(52) U.S. Cl.
CPC .............. *B63B 27/25* (2013.01); *B63B 27/08* (2013.01); *B63B 27/34* (2013.01); *F16L 27/107* (2013.01); *F16L 27/1012* (2013.01); *F16L 33/32* (2013.01)

(58) Field of Classification Search
CPC ......... B63B 27/27; B63B 27/30; B63B 27/34; B63B 27/24; B67D 9/02; E21B 43/013; E21B 43/0135

(Continued)

(56) References Cited

U.S. PATENT DOCUMENTS

| 4,010,500 A | 3/1977 | Reid, Jr. |
| 5,064,329 A | 11/1991 | Brenna |

(Continued)

FOREIGN PATENT DOCUMENTS

| CN | 101382222 A | 3/2009 |
| CN | 101489864 A | 7/2009 |

(Continued)

OTHER PUBLICATIONS

International Search Report issued in Application No. PCT/EP2017/067914, dated Sep. 21, 2017 (5 pages).

(Continued)

*Primary Examiner* — Paul J Gray
(74) *Attorney, Agent, or Firm* — Osha Bergman Watanabe & Burton LLP

(57) ABSTRACT

A coupling system for fluid transfer between a bow area of an elongated vessel and a hydrocarbon delivery installation at open sea. The system includes a support frame for suspending the system to the vessel and a fluid receiving tube segment fixed to the support frame comprising a coupling device arranged at a first end of the tube segment and that establishes a leakage free coupling with a hose valve. The system further includes a remotely controlled drive system that simultaneously exerts a transverse force generating pendulum movements of the coupling device in the transverse plane, a longitudinal force generating pendulum movements of the coupling device in a longitudinal plane, and a rotational force generating rotational movement of at least part of the coupling device iteratively adjusting the rotational position of the at least part of the coupling device by regulating the rotational force.

17 Claims, 13 Drawing Sheets

(51) Int. Cl.
*B63B 27/25* (2006.01)
*B63B 27/08* (2006.01)
*F16L 27/10* (2006.01)
*F16L 27/107* (2006.01)
*F16L 33/32* (2006.01)

(58) Field of Classification Search
USPC .................................................. 137/899.2
See application file for complete search history.

(56) References Cited

U.S. PATENT DOCUMENTS

| | | | |
|---|---|---|---|
| 8,742,941 B2* | 6/2014 | Le Devehat | B67D 9/02 340/669 |
| 9,163,765 B2 | 10/2015 | Hovik et al. | |
| 2008/0109108 A1* | 5/2008 | Lawson | B25J 9/046 700/213 |

FOREIGN PATENT DOCUMENTS

| | | |
|---|---|---|
| CN | 101489865 A | 7/2009 |
| CN | 102036905 A | 4/2011 |
| CN | 102395508 A | 3/2012 |
| CN | 106029492 A | 10/2016 |
| GB | 2240534 B | 3/1994 |
| NO | 318172 B1 | 2/2005 |
| WO | 92/19902 A1 | 11/1992 |
| WO | 2010/137990 A1 | 12/2010 |

OTHER PUBLICATIONS

Written Opinion issued in International Application No. PCT/EP2017/067914, dated Sep. 21, 2017 (7 pages).
International Preliminary Report on Patentability issued in Application No. PCT/EP2017/067914, dated Jun. 21, 2018 (9 pages).
Search Report issued in Norwegian Application No. 20161187, dated Feb. 17, 2017 (2 pages).
Office Action issued in Chinese Application No. 201780039388.8; dated May 7, 2020 (8 pages).

* cited by examiner

A

B

A

B

A

B

COUPLING SYSTEM FOR TRANSFER OF HYDROCARBONS AT OPEN SEA

TECHNICAL FIELD

The present invention relates to a coupling system suitable for fluid transfer between a bow area of an elongated vessel and a hydrocarbon delivery installation at open sea defined in the preamble of claim 1, as well as a transfer system and a method utilizing the coupling system.

BACKGROUND AND PRIOR ART

A bow loading system for a vessel, hereinafter abbreviated BLS, is a system used for transfer of hydrocarbons to a bow area of the vessel from an external loading dock. The loading dock may both be fixed or mobile. Such load transfers takes place usually at open sea since transfer through pipes directly to shore is more convenient at locations closer to the coast. A typical fixed loading dock may be located on a construction arranged with its load bearing structure on the seabed. A typical mobile loading dock is normally situated on a floating construction such as floating facilities of type FSO (Floating, Storage & Offloading), FPSO (Floating Production Storage and Offloading), platforms, etc. It may also be a floating hose-connection that may be picked up from the sea and which is attached to seabed installations such as SAL (Single Anchor Loading solution), UKOLS (Ugland Kongsberg Offshore Loading System), or similar. For floating constructions it is most common to anchor these in a locked specific direction using so-called spread mooring lines or weathervaning systems such as buoy or turret mooring. Often DP (Dynamic Positioning) is used to maintain a fixed position.

Vessels having installed a BLS of the type described above are usually a tanker of type shuttle tanker or shuttle carrier in which the hydrocarbon is stored. However, also smaller vessels without storage space may be used in which the hydrocarbons are transferred further to storage tankers or to conventional tankers.

Common for all such loading systems is the use of a flexible transfer hose, typically made of reinforced rubber materials of one or more layers, for transferring the hydrocarbons.

A typical BLS consists of a tube/pipe arranged at the bow area of the vessel having a coupling device which includes a flange or valve onto which the transfer hose is connected. The end of the transfer hose comprises a hose valve. Partly since the loads on the BLS should remain as low as possible, and partly since it should be feasible to connect the transfer hose, the coupling device is made as one piece a distance into the bow area, or suspended in a coupling system directly above the water surface.

According to patent publication WO 92/19902 the configuration of the coupling system allows the coupling device to move in a suspended pendulum movement in direction along the vessel, having a transverse rotational axis, and a transverse (athwartship) pendulum movement, having a longitudinal (alongside) rotational axis.

The technical jargon for one type of a coupling system is Cardan Suspension or a Moment Free Coupler and constitute a central part of the above mentioned BLS.

FIG. 1 shows an example of a BLS according to WO 92/19902. A mooring hawser 1 is pulled from a mooring winch 3 through a fairlead 6 and a chain stopper 5, all of which are placed on a platform deck. The mooring hawser 1 is guided via the mooring winch 3 down to a main deck to a storage winch 7. The mooring procedure is completed when the chain stopper 5 is locked to a wear chain 2 of the mooring hawser 1. A transfer hose 12 is pulled towards the vessel 100 by means of a hose handling winch 8 and a hose handling rope 15 until being in axial alignment with a coupling system 10.

However, even with the dual pendulum movements disclosed in WO 92/19902 the connection of the hose valve to the coupling system is challenging, in particular when the lateral/horizontal angle between the hose valve and the tube coupling valve becomes large due to weathervaning of the fluid receiving vessel, for example above ±30°, ±60°, ±90°. Consequently, today's coupling systems necessitate an alignment of the vessel prior to coupling by for example use of a dynamic positioning system (DP) since large lateral angles represent a too big hazard, thereby increasing both complexity and cost of the transferring procedure. Furthermore, based on experience, a vessel may be kept with a heading opposing the prevailing weather conditions during a short time only, before been forced to return to initial position.

GB 2240534 discloses a coupling system for fluid transfer between a bow area of a vessel and a hydrocarbon delivery station at open sea. The coupling system comprises a fluid receiving coupling manifold, a coupling member and a working cylinder configured to provide a stewing motion of the coupling manifold towards a loading fork.

One or more embodiments of the invention may provide a fluid receiving coupling system for a fluid transfer hose that allows a reliable coupling between the coupling system and the hose valve over a larger lateral angle compared to the prior art.

One or more embodiments of the invention may provide a coupling system that facilitates the above mentioned axial alignment between the hose valve of the transfer hose and the coupling device of the coupling system.

One or more embodiments of the invention may provide a fluid receiving coupling system that which significantly reduces, or completely removes, the risk of wear out failure of a hose handling rope or a bridle due to rubbing towards parts of the coupling system during coupling.

SUMMARY

One or more embodiments of the present invention is set forth and characterized in the main claims, while the dependent claims describe other characteristics of the invention.

In particular, one or more embodiments of the invention concern a coupling system suitable for fluid transfer between a bow area of an elongated vessel and a hydrocarbon delivery installation at open sea.

The coupling system comprises a support frame suitable for suspending the coupling system to the vessel, a fluid receiving tube segment fixed to the support frame comprising a coupling device arranged at a first end of the tube segment and configured to establish a leakage free coupling with a hose valve. The coupling device may comprise a coupling flange and/or a coupling valve.

The coupling system further comprises a remotely controlled drive system comprising at least three separately controlled drive units, of which the first, second and third drive units are configured to simultaneously exert a transverse force generating pendulum movements of the coupling device in the transverse plane, a longitudinal force generating pendulum movements of the coupling device in a longitudinal plane and a rotational force generating rotational movement of at least part of the coupling device, respectively. This or these part(s) may be the coupling flange, the coupling valve and/or a shield covering at least part of the circumference of the coupling device.

All forces may be activated and maintained by use of dedicated hydraulic cylinders, either directly or indirectly.

The rotational force may alternatively be activated and maintained by for example a DC motor or a rotor-stator based motor.

The transverse plane is defined as a plane oriented transverse the vessel and along the vessel's height when the hose valve coupling system is assembled to the bow area of the vessel. The longitudinal plane is defined as the plane oriented longitudinal the vessel and along the vessel's height when the hose valve coupling system is assembled to the bow area of the vessel.

In an advantageous embodiment the coupling system further comprises a first swivel enabling the pendulum movements in the transverse plane, a second swivel enabling the pendulum movements in the longitudinal plane and a third swivel enabling rotational movements of the at least part of the coupling device.

In yet an advantageous embodiment the support frame comprises two fixing brackets arranged at both transversal sides of the fluid receiving tube segment, i.e. at both sides along the vessel's transversal axis, and a shaft arranged between the two fixing brackets and fixed to the tube segment. In this particular embodiment at least one of the two longitudinal ends of the shaft is pivotally connected to its fixing bracket by a second swivel, and the remotely controlled drive system is configured to generate the pendulum movements of the coupling device in the longitudinal plan by exerting the longitudinal force onto the shaft. The arrangement of the fixing brackets may be symmetrical around the axial axis of the tube segment.

In yet an advantageous embodiment the coupling system further comprises a cylinder or drum arranged between the two fixing brackets at a vertical height above the fluid receiving tube segment when the coupling system is assembled to the bow area of the vessel. The cylinder may be pivotably coupled to the two fixing brackets via for example discs rotating by use of the same swivel as for the above mentioned shaft. The pivot movements may be generated by exerting a fourth remotely controlled force directly or indirectly onto the cylinder by the drive system, for example by use of a dedicated hydraulic cylinder.

In yet an advantageous embodiment the coupling system further comprises a spooling gear arranged near, above, or fixed on top of, the cylinder, and which is movable in the direction parallel to the cylinder's longitudinal axis.

In yet an advantageous embodiment the shaft is designed such that a recessed portion of the shaft is located further aft relative to its fixing points to the fixing brackets when the coupling system is assembled to the bow area of the vessel. The distance may for example be 50% of the total length of the shaft. The maximum distance between the shaft's fixing points to the fixing brackets and the recessed portion constitutes more than 10% of the transverse distance between the two fixing brackets.

In yet an advantageous embodiment the coupling system further comprises a cylinder arranged between the two fixing brackets at a vertical height above the shaft when the hose valve coupling system is assembled to the bow area of the vessel.

In yet an advantageous embodiment the fluid receiving tube segment is designed with at least one elbow or bend.

In yet an advantageous embodiment the coupling device comprises gripping means configured to releasably couple the coupling device to the hose valve after abutment therebetween.

In yet an advantageous embodiment the coupling device further comprises the at least partly surrounding shield comprising a plurality of radially extending protrusions. If the shield is absent, the plurality of radially extending protrusions may be directly on the coupling flange and/or coupling valve.

One or more embodiments of invention may also concern a transfer system suitable for transferring hydrocarbons from a hydrocarbon delivery installation to a vessel at open sea. The transfer system comprises an elongated vessel, a coupling system in accordance with any one of above mentioned features, a transfer hose extending between the vessel and the hydrocarbon delivery installation during transfer and a hose handling rope fixed at one end to the hose valve and the other end to a pull-in winch on or inside the vessel. The coupling system is fixed at the lateral extremity of the vessel by the support frame. Furthermore, the transfer hose comprises at one end a hose valve connectable to the coupling device of the coupling system. The hose handling rope may be fixed to the hose valve via a bridle, where the two ends of the bridle is fixed to diametrically opposite sides of the hose valve.

Herein the term lateral/horizontal is defined as a direction in a plane oriented parallel to the vessel's main and/or parallel to the water surface during calm weather conditions.

In an advantageous embodiment the coupling system is arranged at the bow area of the vessel.

In another advantageous embodiment the support frame comprises two fixing brackets arranged at both transversal sides of the fluid receiving tube seen along the longitudinal direction of the vessel and a shaft arranged between the two fixing brackets and fixed to the tube segment. The shaft is designed such that a recessed portion of the shaft is located further aft of the vessel relative to the center position of the shaft's ends to the fixing brackets. The maximum distance between the center position and the recess portion is set to allow the transfer hose to be coupled to the coupling system at a lateral angle of more than 100 degrees while avoiding direct impact between the shaft and the hose handling rope at any moment of the coupling procedure that may cause significant wear of the hose handling rope. The lateral angle is defined as the angle from the longitudinal plane to the position of the approaching hose valve. The recessed portion may for example constitute 10, 20, 30, 40 or 50% of the total length of the shaft. The term 'significant wear' signify wear that may jeopardize the operation of the alignment and transfer procedure.

One or more embodiments of the invention may also concern a method of transferring fluid from a fluid source to a vessel at open sea by use of a transfer system in accordance with any one of the above mentioned features.

The method comprising the following steps:
connecting an end of the transfer hose in fluid communication with a fluid source,
closing the hose valve connected to the other end of the transfer hose,
optionally closing any coupling valve of the coupling device,
connecting an end of the hose handling rope to the hose valve, perhaps via a bridle,
connecting the other end of the hose handling rope to a pull in winch through an upper part of the transfer system arranged above the coupling device, pulling the hose valve towards the coupling system by use of the pull in winch at least until the hose valve is located above the water line and at a transverse position equal or near the transverse position of the coupling device and while proceeding pulling the hose valve towards the coupling system, iteratively adjusting the position of the coupling device in the transverse plane by regulating the transverse force, the longitudinal plane by regulating the longitudinal force and the rotational position of at least part of the coupling device by a rotational force, simultaneously, in order to optimize an alignment of the center axis of the coupling device with the center axis of the hose valve, abutting the coupling device and the hose valve with their axial axes aligned, activing gripping means releasably connecting the coupling device to the hose valve, establishing leakage free coupling therebetween, opening the coupling valve and the hose valve for fluid communication and optionally opening the coupling valve of the coupling device.

The remotely controlled drive system is inter alia configured to exert a rotational force generating rotational movement of at least part of the coupling device. By iteratively adjusting the rotational position of the at least part of the coupling device by regulating the rotational force the degree of rotation is regulated.

In another advantageous embodiment the support frame comprises two fixing brackets arranged at both transversal sides of the fluid receiving tube segment and that the coupling system further comprises a pivotable cylinder oriented parallel to the transverse plane and arranged between the two fixing brackets at a vertical height above the fluid receiving tube segment, wherein the method further comprises iteratively adjusting the longitudinal position of the cylinder around its pivot point by regulating a pivot force acting on the cylinder by the remotely controlled drive system.

In yet an advantageous embodiment coupling system further comprises a spooling gear arranged above or on top of the cylinder and movable in the direction parallel to the cylinder's longitudinal axis, wherein the method comprises the steps of guiding the other end of the hose handling rope through the spooling gear and iteratively adjusting the transverse position of the spooling gear during the iterative position adjustment of the coupling device.

In the following description, numerous specific details are introduced to provide a thorough understanding of embodiments of the claimed coupling system, transfer system and method. One skilled in the relevant art, however, will recognize that these embodiments can be practiced without one or more of the specific details, or with other components, systems, etc. In other instances, well-known structures or operations are not shown, or are not described in detail, to avoid obscuring aspects of the disclosed embodiments.

DETAILED DESCRIPTION

Figure 1:
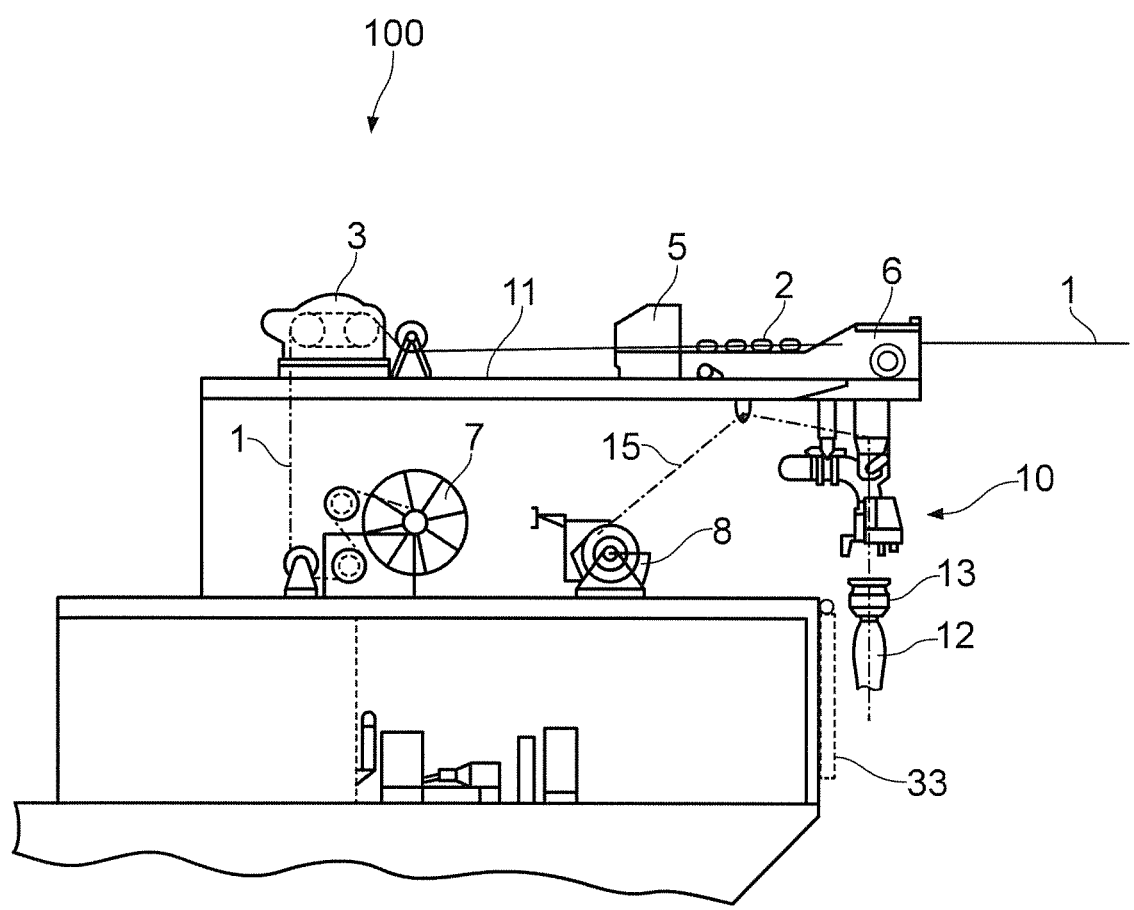
FIG. 1 is a cross sectional view of a bow loading system in accordance with prior art.

FIG. 1 shows an example of a prior art BLS as described above, where a coupling system 10 is suspended from a deck structure 11 at the bow area of a vessel 100.

Figure 2:
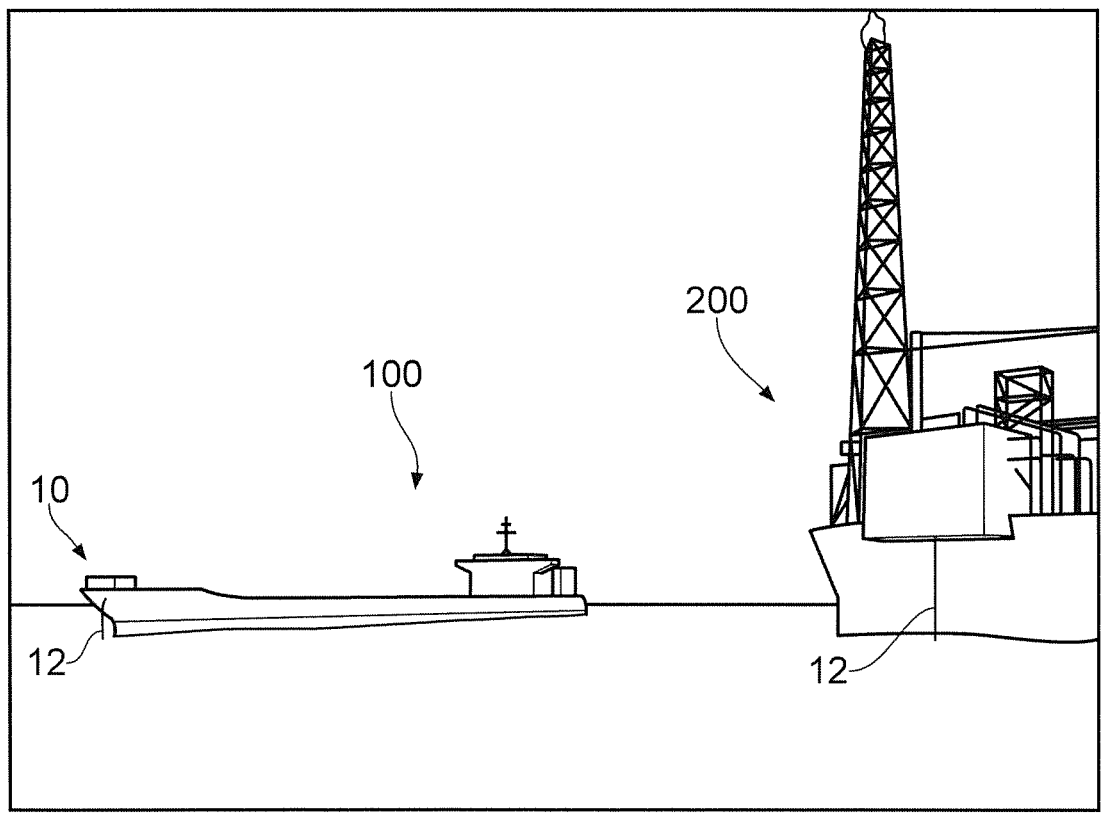
FIG. 2 is a perspective view of a vessel in accordance with one or more embodiments of the invention, facing its port side towards a FPSO.

A complete hydrocarbon transfer system is illustrated in FIG. 2, including a vessel 100 with a BLS, a transfer hose 12 and a hydrocarbon delivery installation 200 of type FPSO. During hydrocarbon transfer, the transfer hose 12 extends between a manifold on the FPSO 200 and the coupling system 10 on the vessel 100.

Figure 3:
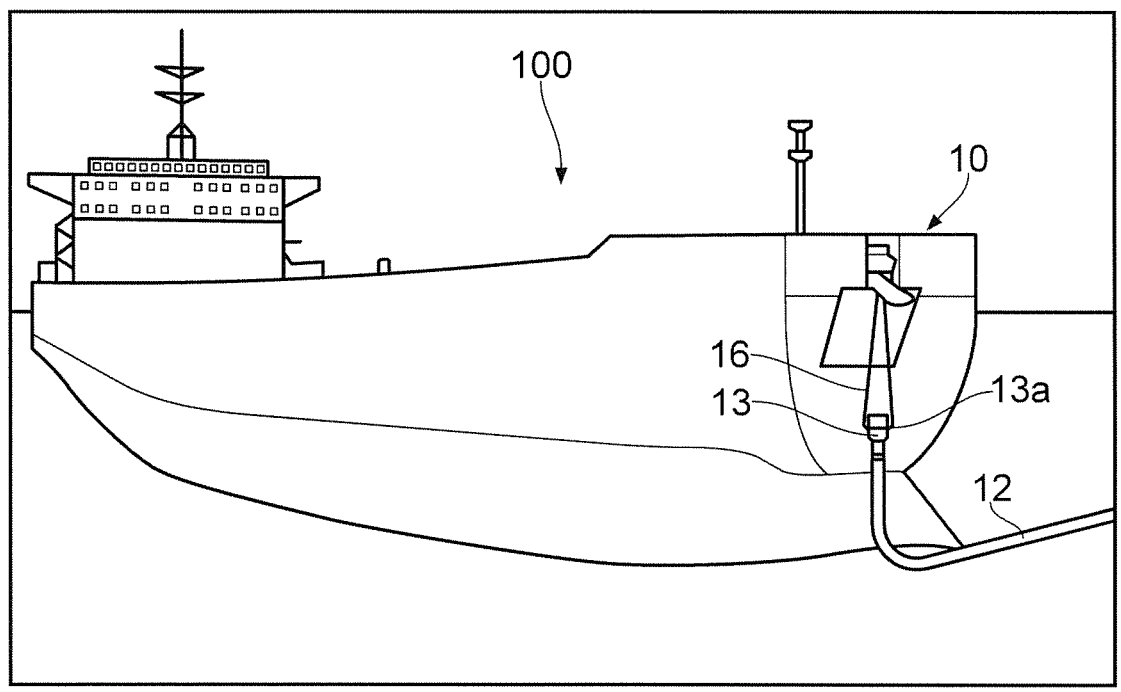
FIG. 3 is a perspective view of the vessel in FIG. 2 seen from in front, where the fluid transfer hose is suspended a distance below the fluid receiving coupling system in accordance with one or more embodiments of the invention, FIGS. 4 A, B and C are perspective views of a fluid receiving coupling system in accordance with one or more embodiments of the invention, where

As further illustrated in FIG. 3, a hose valve 13 is connected to the vessel directed end of the transfer hose 12. The pull-in operation is achieved by connecting one end of a hose handling rope 15 to a pull-in winch 8 and the outer end to the hose valve 13 via a bridle 16. The two bridle ends 16a,b are attached to respective hose valve ears 13a,b protruding radially from the hose valve 13. FIG. 3 shows an intermediate stage of a transfer hose coupling where the hose valve 13 has been raised from the water and suspended directly below the coupling system 10 of the vessel 100. The orientation of the transfer hose 12 is shown to be more than 90 degrees from the longitudinal plane of the vessel 100, thus creating a horizontal component of the hose valve 13 against the vessels direction of travel (i.e. from bow to aft).

Figure 4:
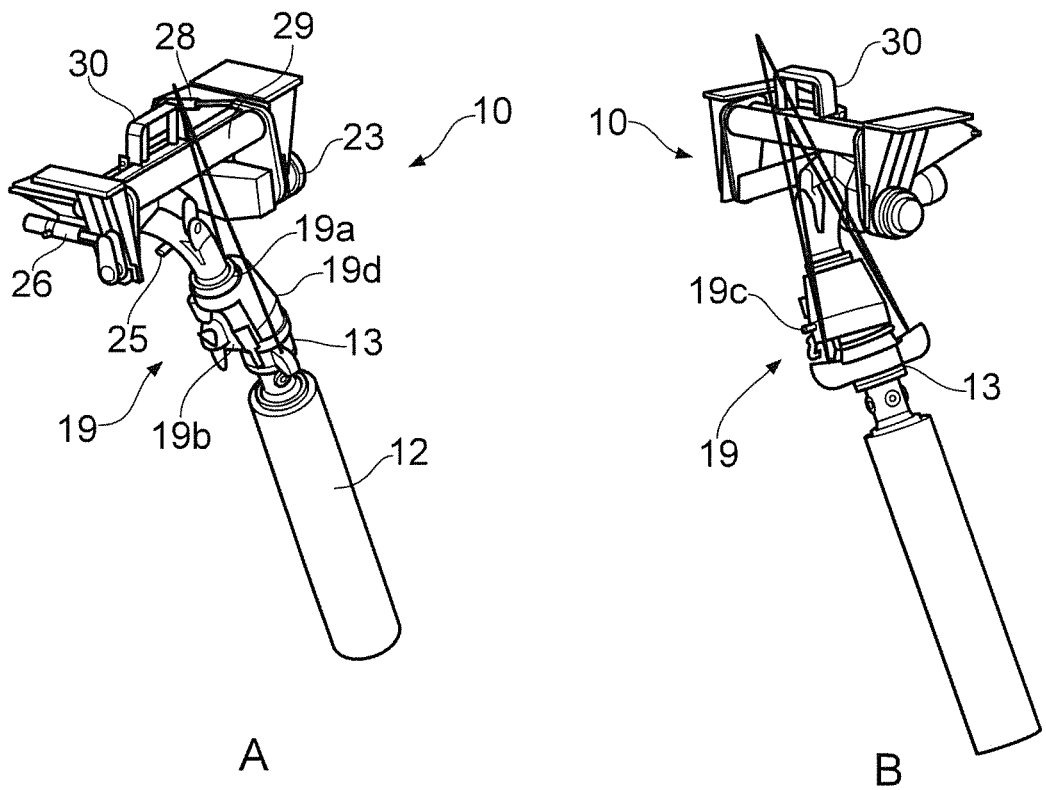
FIGS. 4A and 4B show the coupling system seen from two different angles and FIG. 4C shows an upper part of the coupling system in more detail, FIGS. 5 A and B are perspective views of part of a fluid receiving coupling system in accordance with one or more embodiments of the invention, where
Figure 4:
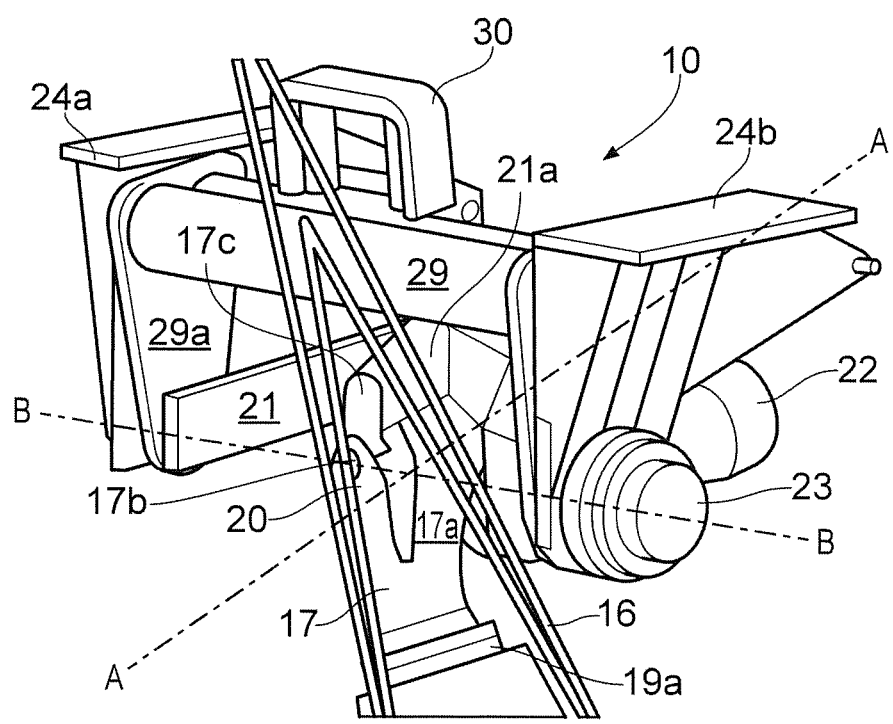

Further details of the final stage of the coupling process between the coupling system 10 and the hose valve 13 are illustrated in FIGS. 4 A, B and C. In this particular embodiment the coupling system 10 is of a type known as a cardan suspension 10.

The cardan suspension 10 comprises a bent tube segment 17 fixed at one end to a coupling device 19. The coupling device 19 further comprises a coupling flange 19a and/or a coupling valve 19b in order to enable closure of fluid/leakage when the hose valve 13 is disconnected. The coupling flange 19a may be welded to the end of the tube segment 17. Further, the tube segment 17 is suspended in two tube brackets 20 to an above positioned beam structure or cardan 21. The tube brackets 20 are welded to the tube segment 17 at the bend 17a. In the upper ends, the brackets 20 have bores for a cylindrical load cell 17b, the middle portion of which is journaled in a cardan beam or cardan suspension beam 17c. The load cell 17b may measure forces perpendicular to its longitudinal axis.

Figure 5:
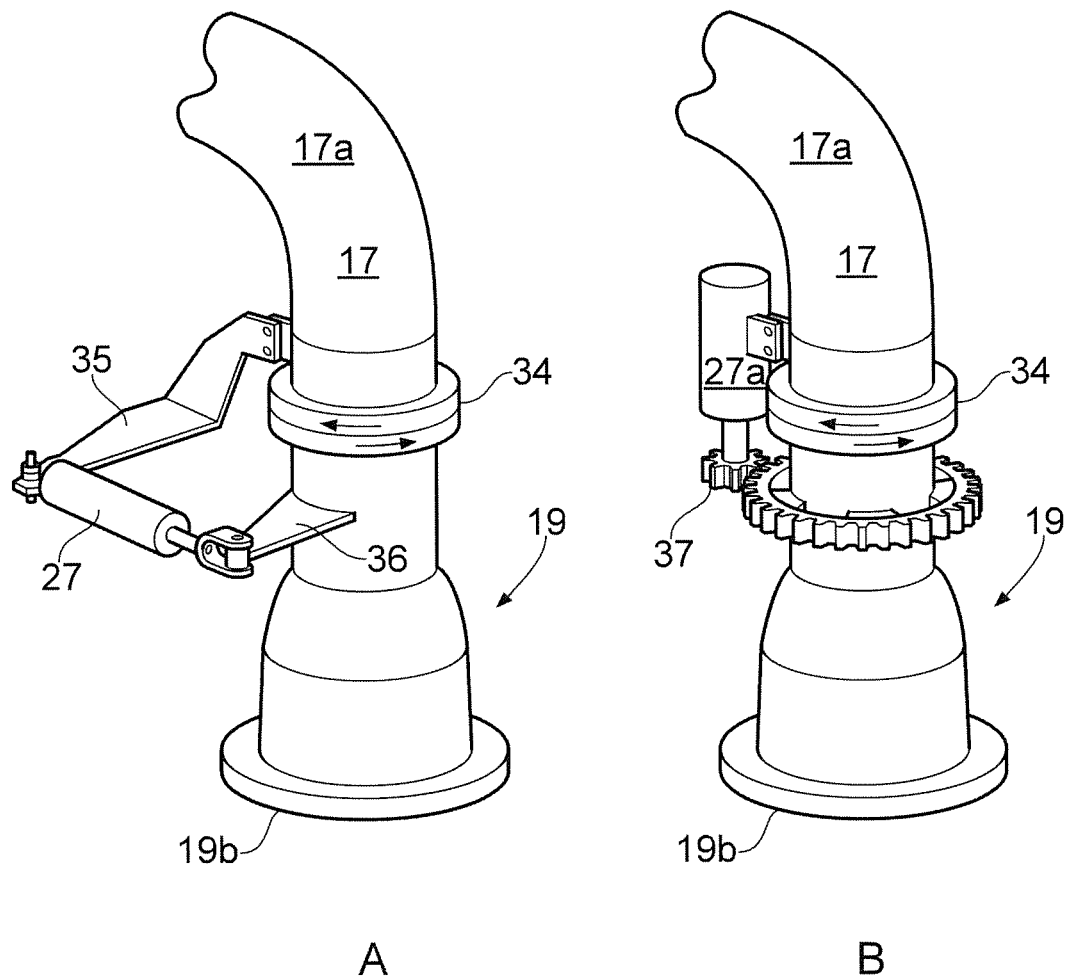
FIGS. 5A and 5B show two different drive units for the rotational movement of the coupling device.

The other end of the tube segment 17 is fixed to a tube swivel 18. The two tube brackets 20 are bored coaxially with this tube swivel 18 such that the bend 17a of the tube segment 17 may pivot around a rotational axis A-A shown in FIGS. 4 and 5 by use of a dedicated drive unit such as a hydraulic cylinder 25.

The cardan suspension beam 17c is fixed to a cardan protrusion 21a protruding in the aft-bow direction from a mid-section of the cardan 21. The ends of the cardan 21 is connected to a cardan swivel 23, either directly or via a second tube segment 22 continuing downstream from the tube swivel 18, enabling pivoting moments of the cardan 21 around a rotational axis B-B being perpendicular to and horizontally coplanar with the rotational axis A-A, and thereby pivoting movements of the coupling device 19 within the longitudinal plane. Note that 'downstream' is referred to the situation where hydrocarbons flow into the coupling system 10. Activation and maintenance of the pivoting movements may be achieved by a dedicated drive unit such as a hydraulic cylinder 26. Hence, coupling system 10 as shown in FIG. 4 forms a cardan suspension for hydrocarbon carrying transfer hoses 12 that enable transfers that do not transmit bending moments to the supporting structure fixed to the vessel 100. The supporting structure in FIG. 4 includes two fixing brackets 24a,b arranged on both sides of the cardan 21. The cardan swivel 23 is seen at one of the fixing brackets 24b at the side opposite of the side of the cardan 21.

The entire hose force or the major part of the hose force will be taken up by the load cell 17b.

Due to the cardan protrusion 21a a large part of the cardan 21 may be located an arbitrary distance aft of the rotational axis B-B. This non-zero distance is advantageous since the risk of potentially damaging impact between the hose valve connected bridle 16 and the cardan 21 may be avoided or at least significantly reduces. This is of particular importance when the incoming angle of the transfer hose 12 relative to the longitudinal plane of the vessel 100 is large, for example exceeding 90°. This situation is shown in FIG. 4 by projecting a small model of a vessel and three different orientations of the transfer hose on to a horizontal plane. The illustrated transfer hose 12 is seen to exceed the line oriented transverse to the vessel 100, resulting in a component of the transfer hose 12 and the bridle 16 directed aft of the vessel 100. Due to the recess created by the non-zero distance from the rotational axis B-B this aft-directed component does not cause any harmful impact on the cardan 21. Safe handling of transfer hoses with large incoming angles is advantageous since it inter alia permits hydrocarbon transfer during heavy weathervaning of the vessel 100 without the need for spending an excess amount of power consumption.

In order to further improve the alignment and coupling procedure, the coupling system 10 shown in FIG. 4 is also equipped with a drum or roller 29 fixed between the fixing brackets 24a,b, and oriented parallel with, and above, the rotational axis B-B. The roller 29 is made pivotable within the longitudinal plane of the vessel 100 by use of one or more pivotable sheaves 29a arranged between the roller ends and the fixing brackets 24a,b and a dedicated drive unit such as a hydraulic cylinder 28, thereby serving as additional adjustment means for the alignments between the axial position of the hose valve 13 and the axial position of the coupling device 19. The pivotable sheaves 29a may use the cardan swivel 23 as rotation means. However, one or more dedicated swivels are possible.

The embodiment of FIG. 4 further shows a transverse moving spooling gear 30 connected to the pivotable roller 29, enabling remotely controlled transverse movement of the hose valve 13 over at least part of the full axial length of the roller 29. The spooling gear 30 may be a spooling gear as described in the patent publication WO 2014/106644 A1, which is hereby incorporated as reference. However, any kind of spooling gear capable of moving a rope/cable along an axial orientation of an attached or nearby positioned drum may be applied.

Even further improvement of the alignment and coupling may be obtained by configuring the coupling device 19 such that at least part of the coupling device may rotate axially by remote control of a drive unit. The possibility of rotation is particularly useful when the coupling device 19 also comprises radially protruding ears 19c onto which the bridle 16 may be supported. In FIG. 4 two of such protruding ears 19c are arranged diagonally onto a co-rotating shield 19d.

Note that FIG. 4 shows two imaginary bridle arrangements when the bridles 16 have junction positions arranged at two different vertical positions and without being affected by the roller 29. In both cases, the bridle 16 has a horizontal component in the aft direction, necessitating a recess in the cardan 21.

The coupling system 10 may also include means for rotating part of, or the entire, coupling device 19. FIGS. 5A and 5B show two different embodiments for remotely initiating and maintaining such rotational movements. In FIG. 5A the drive unit is a hydraulic cylinder 27 mounted with its two ends to an upper and a lower bar 35,36 extending radially from a location above and below a coupling device swivel 34, respectively. The orientations of the bars 35,36 set up a movement of the hydraulic cylinder 27 in a direction approximately tangential to the coupling device swivel 34, thereby inducing the desired rotation of the coupling device 19. In FIG. 5B the hydraulic cylinder is replaced by a motor 27a with motor gear wheel 37 arranged next to the coupling device swivel 34. In this particular embodiment the motor 27a is non-rotationally coupled to the tube segment 17 and rotationally coupled to the coupling device 19 by meshing the motor gear wheel 37 with corresponding coupling device gear wheel 38 on the coupling device 19.

Figure 6:
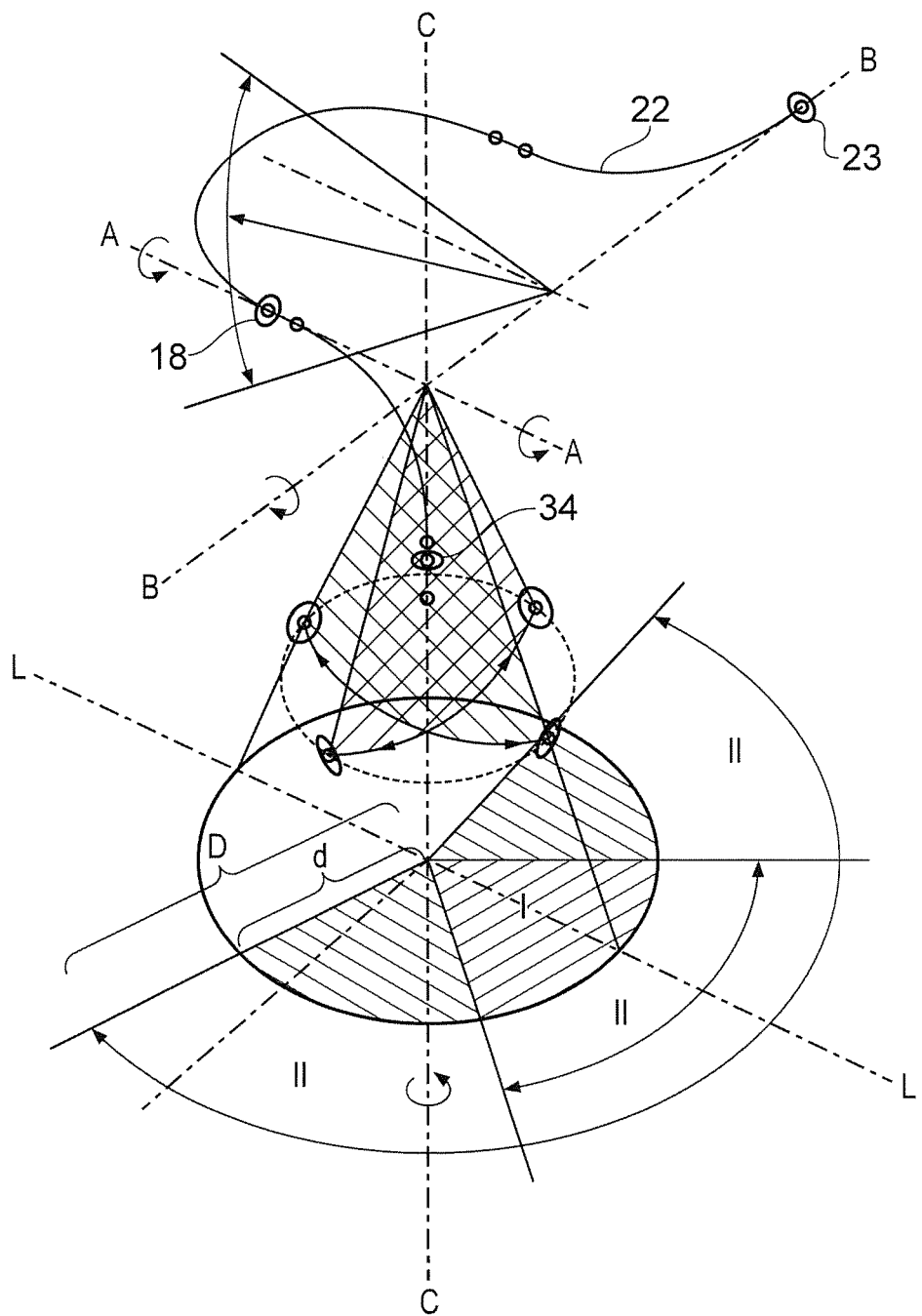
FIG. 6 is a perspective view of the principal degrees of freedom of a fluid receiving coupling system in accordance with one or more embodiments of the invention.

FIG. 6 summaries the principal degrees of freedom of the inventive coupling system 1 as described above, that is pendulum movements of the coupler device 19 in the transverse plane by aid of one or more tube swivels 18 having a rotational axis along A-A and arranged at the end of the bent tube segment 17 opposite to the coupling device end, pendulum movements of the coupler device 19 in the longitudinal plane by aid of one or more cardan swivels 23 having a rotational axis along B-B being perpendicular to, and coplanar with, axis A-A, and arranged at the end(s) of the second tube segment 22 and/or the cardan 23, rotational movement of at least part of the coupler device 19 by aid of a coupling device swivel 34 having a rotational axis along C-C being perpendicular to both axis A-A and B-B and arranged at any point from the fluid receiving end of the coupling device 19 to the start of the bend 17a of the tube segment 17, for example within the coupler device itself.

In FIG. 6 the longitudinal vessel axis is indicated as parallel to axis A-A. With reference to the longitudinal vessel axis L-L, the pendulum movements are shown, both in perspective and projected onto the horizontal plane. Since there are more degrees of freedom available for the coupling device 19 in the inventive coupling system 10 compared to prior art systems, the length of the part of the tube segment 17 extending from the bend 17a and to the coupling device opening may be longer without jeopardizing the safety and/or accuracy of the alignment and coupling procedure at open sea. This increase in length results in an increase in sweeping sector from the old sector I with diameter d to a new sector II with larger diameter D.

In addition, since the shape of the second tube segment 22 and the cardan 21 allows horizontal components of the bridle 16 and/or hose handling rope 15 in direction bow-aft, the angle of the new sector II at both sides of the longitudinal vessel axis L-L may be increased compared to the old sector I significantly, for example from ±30° being typical for prior art coupling systems to ±110° for the inventive coupling system 10. Even larger sectors may be envisaged.

Figure 7:
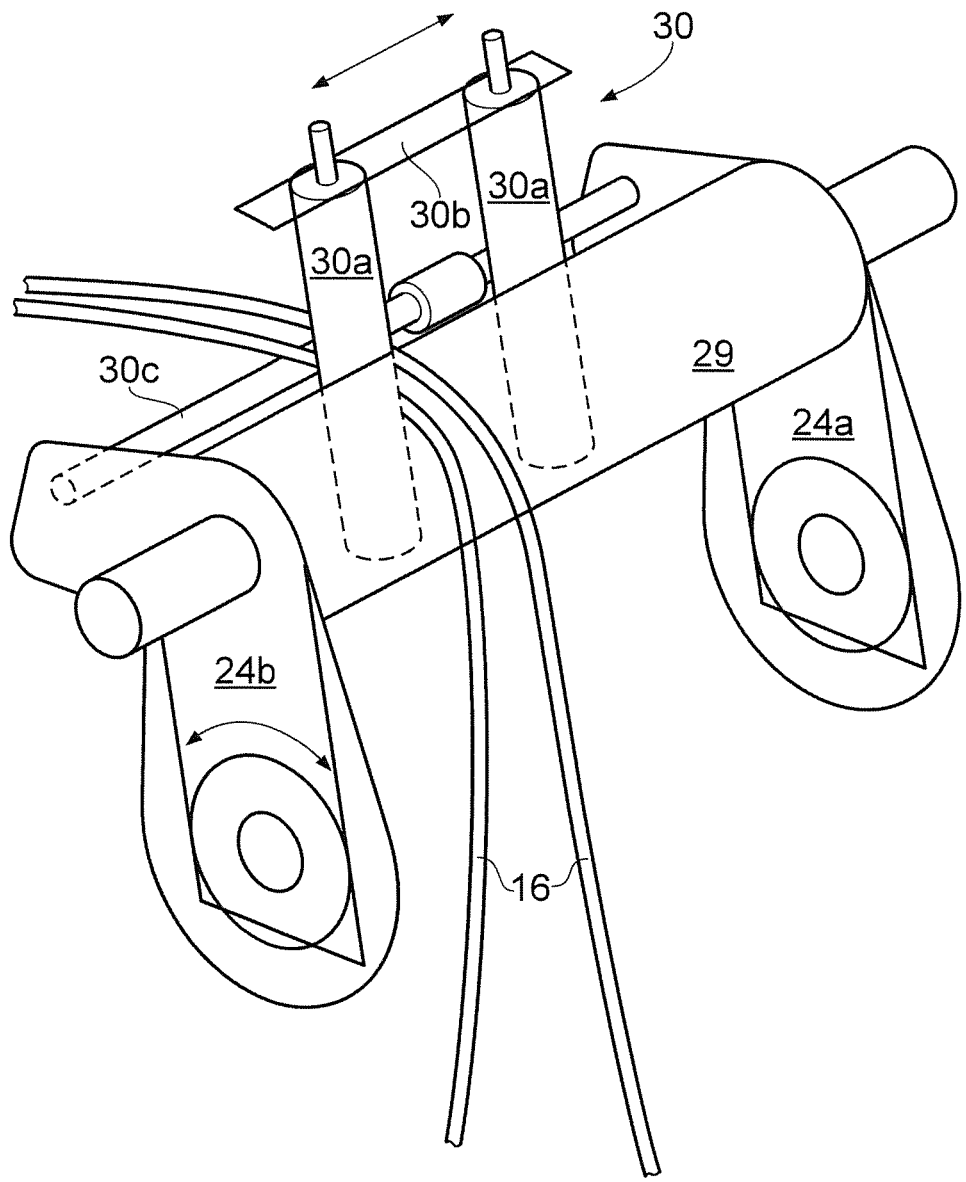
FIG. 7 is a perspective side view of a roller and a spooling gear constituting part of the fluid receiving coupling system in accordance with one or more embodiments of the invention.

FIG. 7 illustrates in further detail the roller 29 and the spooling gear 30. The hose handling rope 15 and the bridle 16 are guided in between to guiding sticks 30a interconnected by a guiding stick beam 30b. The spooling gear 30 further comprises a spooling gear drive shaft 30c arranged between the fixing brackets 24a,b to enable remote controlled movement along the length of the roller 29. As illustrated, the two ropes of the bridle 16 opens up in a specific angle set by the distance between the attached hose valve ears 13a,b.

FIGS. 8-13 show in perspective different stages of the alignment and coupling procedure.

Figure 8:
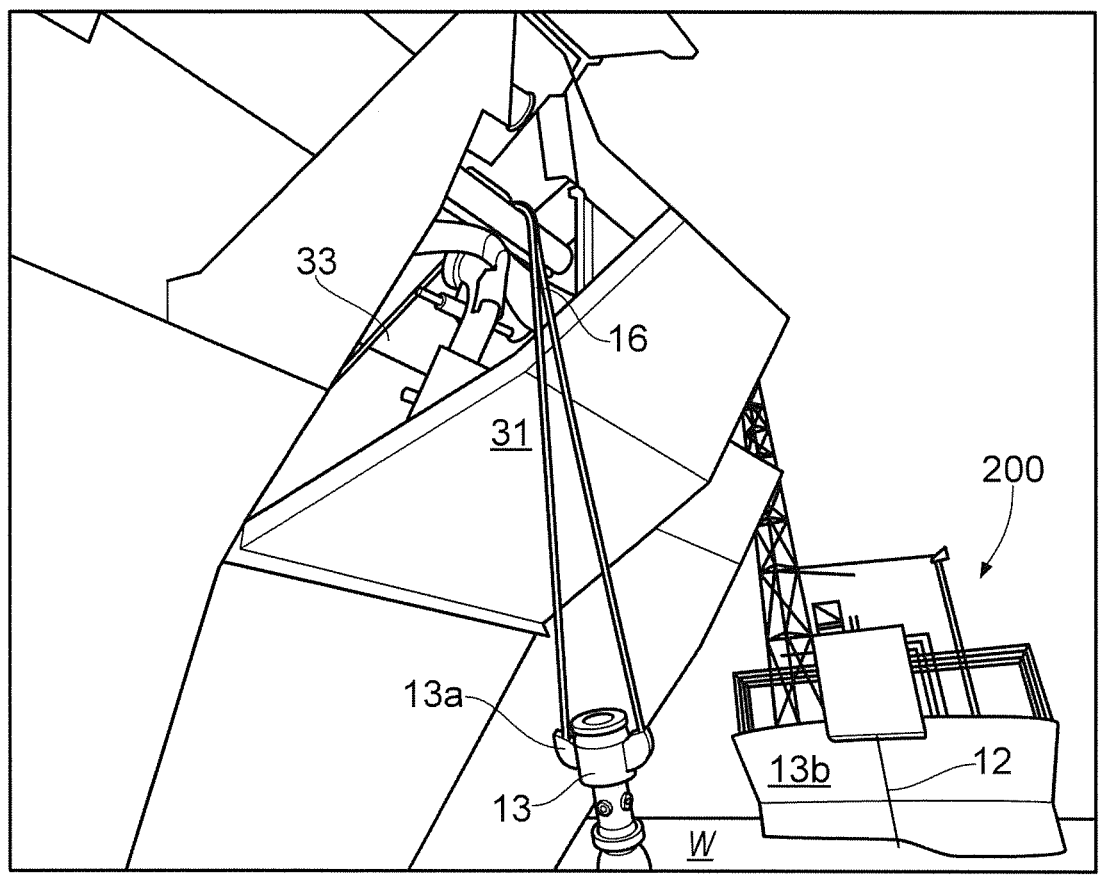
FIG. 8 is a perspective view of the bow area of the vessel in FIG. 2 having its bow hatch partly open in accordance with one or more embodiments of the invention, FIGS. 9 A and B are perspective views of the bow area of the vessel in FIG. 2, where the coupling device is arranged in a parking position and a coupling position, respectively, in accordance with one or more embodiments of the invention, FIGS. 10 A and B are perspective views of the bow area of the vessel in FIG. 2 showing positions of the coupling device before and after a simultaneous transfer pendulum movement and a clockwise rotation, respectively, in accordance with one or more embodiments of the invention, FIGS. 11 A and B are perspective views of the bow area of the vessel in FIG. 2 showing positions of the roller in a forward and a backward tilted position, respectively, in accordance with one or more embodiments of the invention, FIGS. 12 A and B are perspective views of the coupling device of the coupling system and the hose valve of the transfer hose at two final stages of their approach in accordance with one or more embodiments of the invention, and FIGS. 13 A and B are perspective views of the coupling device of the coupling system and the hose valve of the transfer hose close to contact and at contact, respectively, in accordance with one or more embodiments of the invention.
Figure 9:
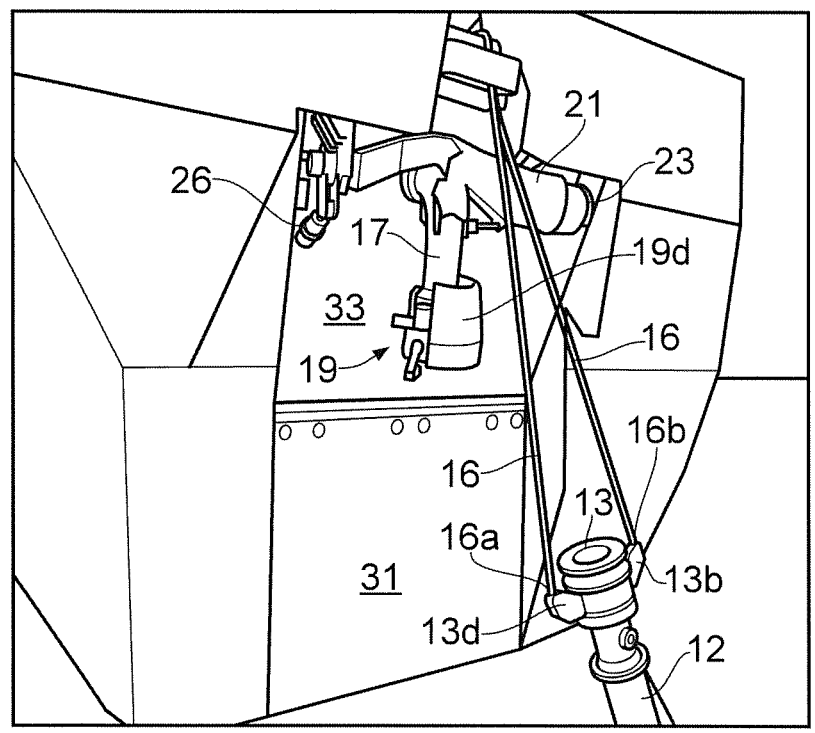
Figure 9:
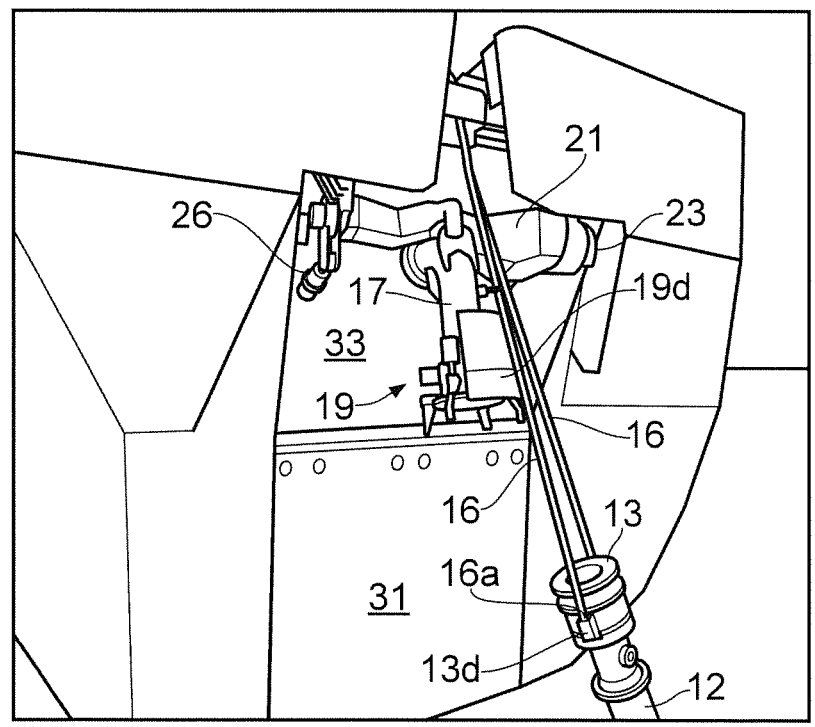
Figure 10:
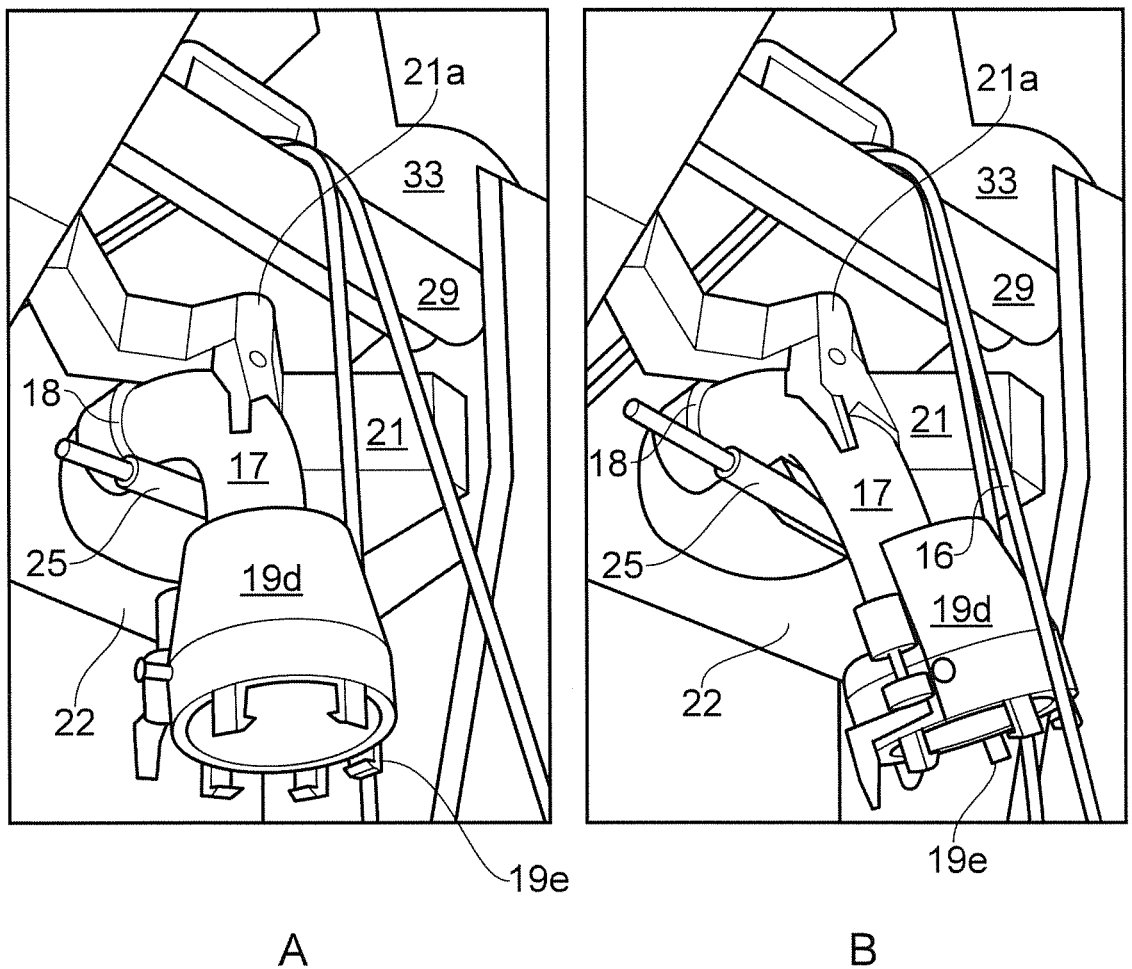

In the stage illustrated in FIG. 8 the hose valve 13 and the transfer hose 12 has been pulled in by the hose handling rope 15 and/or bridle 16 to a position above the water surface W while the bow hatch 31 covering a compartment 33 of the coupling system 10 is opening up. A transfer hose connected FPSO 200 is seen in the background.

In FIG. 9A the bow hatch 31 has been opened up completely. The stage of the pull-in operation of the hose valve 13 and the position of the coupling device 19 is however identical to the stage seen in FIG. 7. In FIG. 9B the position of the hose valve 13 remains the same, but the cardan 21 has been pivoted around the B-B axis by operator controlled operation of the hydraulic cylinder 26, thereby causing the coupling device 19 to protrude from the coupler system compartment 33 to a position directly above the water.

FIGS. 10A and 10B illustrate the coupler system 10 in more detail, and with two different positions of the coupler device 19 during pivoting of the tube segment around the axis A-A using the hydraulic cylinder 25 and the tube swivel 18, and a simultaneous rotation of at least the shield 19d of the coupling device 19 using the coupling device swivel 34 (see FIG. 6). As is clear from FIG. 10B the simultaneous pendulum movements in the transverse direction and the rotation of the shield 19d results in a desired insertion of the coupling device 19 into the opening of the bridle 16.

Figure 11:
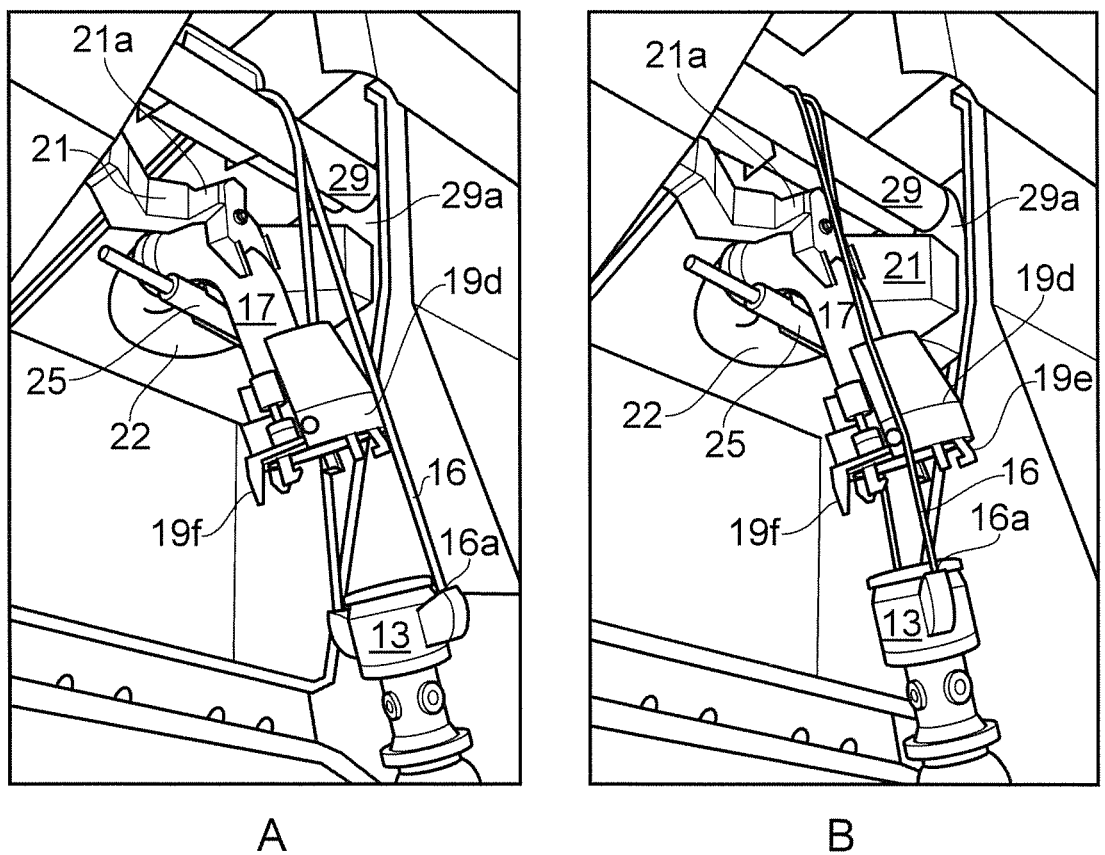
Figure 12:
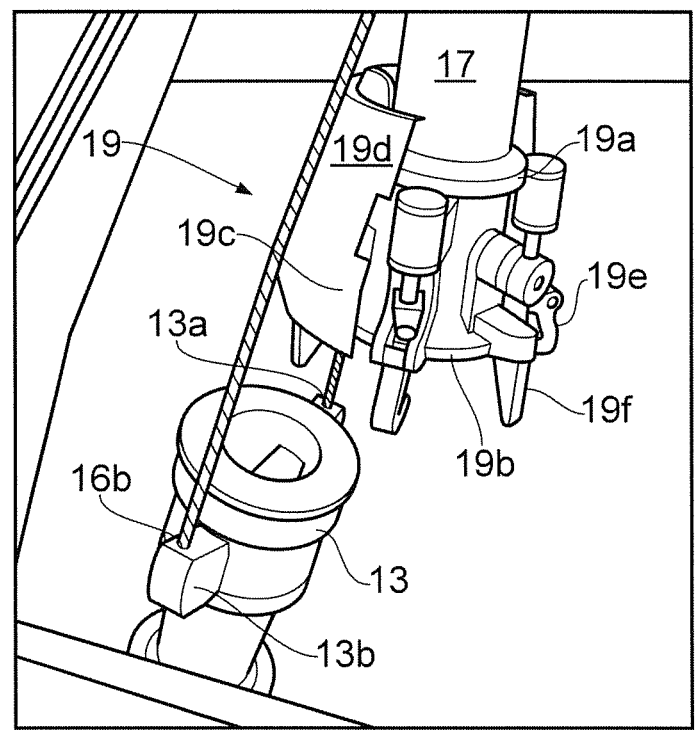
Figure 12:
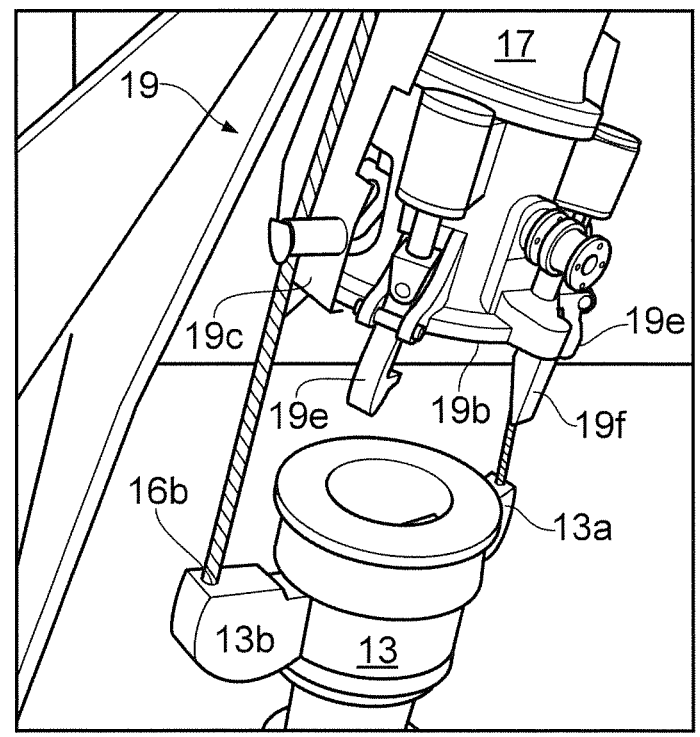
Figure 13:
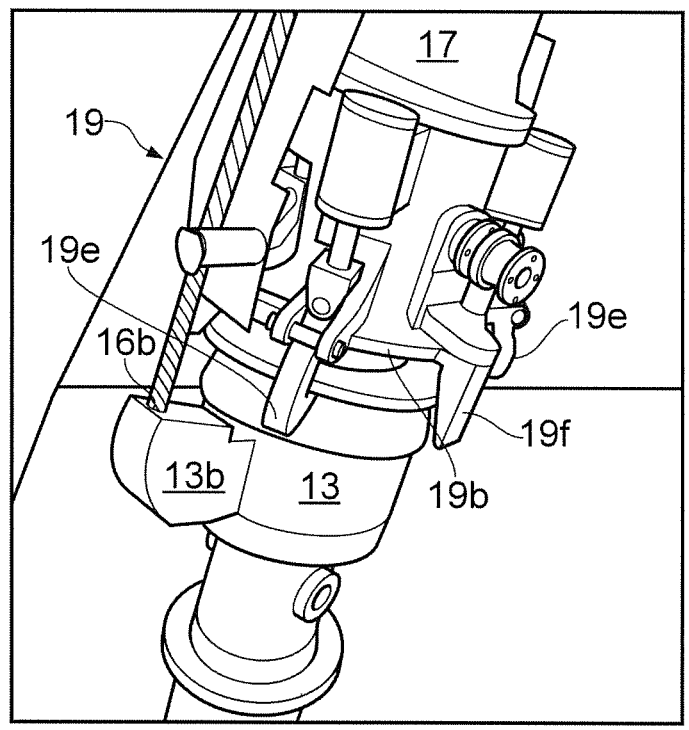
Figure 13:
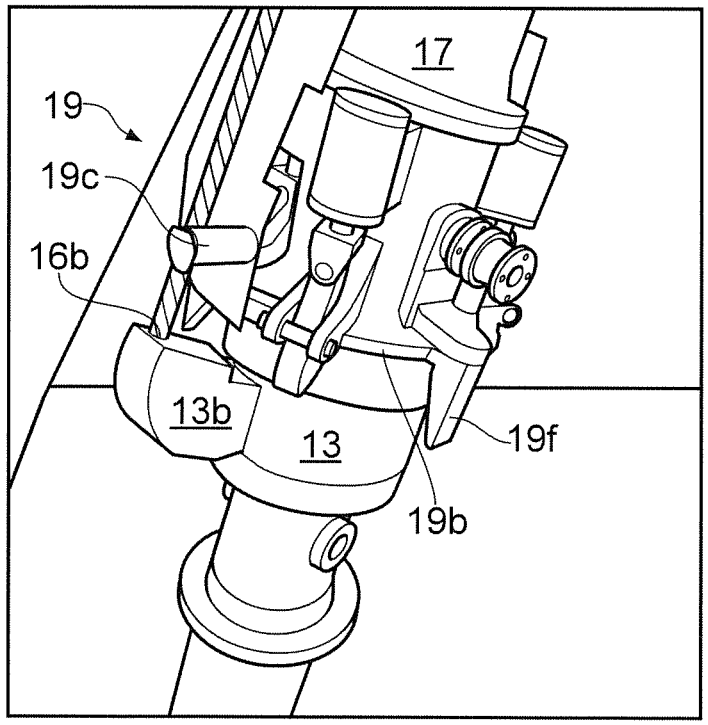

Such an insertion is illustrated also in FIGS. 11A and 11B. However, instead of performing pendulum movements and rotation of the coupling device 16, the final insertion of the coupling device 16 into the bridle opening such that the bridle ropes are supported on the shield ears 19c is achieved by pivoting the roller 29 and the spooling gear 30 in the bow-aft direction using the pivotable sheaves 29a. FIGS. 12A and 12B show a similar stage of the alignment and coupling procedure as FIGS. 11A and 11B, but now from within the coupler device compartment 33. The coupling claws 19e enabling remotely operated coupling of the coupling flange 19a/coupling valve 19b to the hose valve 13 is clearly seen in FIG. 12. In both FIGS. 11 and 12 guides 19f for aiding the final alignment stage between the coupling device 19 and hose valve 13 are shown.

Lastly, FIGS. 13A and 13B show the final coupling stage just before and after a successful axial alignment of the coupling device 16 with the hose valve 13, respectively. In FIG. 13B the coupling claws 19e have been activated remotely in order to clamp the coupling valve 19b and the hose valve 13 in a leak free coupling prior to opening for fluid.

The alignment and coupling procedure is normally a highly iterative process, where the operator remotely adjusts and re-adjusts the position of the coupling device during continuous monitoring.

Some or all of the above mentioned adjustment and coupling operations may as well be operated manually. Furthermore, some or all of the above mentioned adjustment and coupling operations may be performed fully automatic by installing appropriate sensors within the coupling system 10. As an example, one or more proximity sensors may be installed on the coupling device 16 and/or the hose valve 13 to monitor the distance and/or angle of approach. These and other sensors may communicate their measured values to a control system for determining further adjustment or coupling operations, either completely autonomous or under control of the operator. The sensors and/or activation units may also be configured with means to inter-communicate between themselves and to make process and data based on the inter-communicated values.

In the preceding description, various aspects of the coupling system 10 and transfer system according to the invention have been described with reference to the illustrative embodiment. For purposes of explanation, specific numbers, systems and configurations were set forth in order to provide a thorough understanding of the systems and their workings. However, this description is not intended to be construed in a limiting sense. Various modifications and variations of the illustrative embodiment, as well as other embodiments of the systems, which are apparent to persons skilled in the art to which the disclosed subject matter pertains, are deemed to lie within the scope of the present invention.

LIST OF REFERENCE NUMERALS/LETTERS

1 Mooring hawser
2 Wear chain
3 Mooring winch
5 Chain stopper

6 Fairlead
7 Storage winch
8 Pull in winch
10 Coupling system, Cardan Suspension,
11 Deck structure
12 Transfer hose
13 Hose valve
13a,b Hose valve ears
15 Hose handling rope
16 Bridle
16a,b Bridle ends
17 Tube segment, fluid receiving tube segment
17a Bend (of tube segment)
17b Cylindrical load cell
17c Cardan beam/cardan suspension beam
18 Tube swivel/first swivel
19 Coupling device
19a Coupling flange,
19b Coupling valve
19c Radially protruding ears, shield ears
19d Shield
19e Coupling claws, gripping means
19f Guide
20a,b Tube brackets
21 Cardan, beam structure, shaft
21a Cardan protrusion
22 Second tube segment
23 Cardan swivel/second swivel
24a,b Fixing brackets
25 Hydraulic cylinder for inducing pendulum movements coupling flange/valve around axis A-A, first drive unit
26 Hydraulic cylinder for inducing pendulum movements of coupling flange/valve around axis B-B, second drive unit
27 Hydraulic cylinder for inducing rotational movements of coupling flange/valve, third drive unit
27a Motor for inducing rotational movements of coupling flange/valve, third drive unit
28 Hydraulic cylinder for inducing pivoting movements of roller in the aft-bow direction, fourth drive unit
29 Roller, drum, cylinder
29a Pivotable sheaves
30 Spooling gear
30a Guiding sticks
30b Guiding stick beam
30c Spooling gear drive shaft
31 Bow hatch
33 Coupling system compartment
34 Coupling device swivel
35 Upper bar above coupling device swivel 34
36 Lower bar below coupling device swivel 34
37 Motor gear wheel
38 Coupling device gear wheel
100 Vessel
200 Floating facility, FSO, FPSO, platform

The invention claimed is:

1. A coupling system for fluid transfer between a bow area of an elongated vessel and a hydrocarbon delivery installation at open sea,
the coupling system comprising:
a support frame that suspends the coupling system to the vessel, and
a fluid receiving tube segment fixed to the support frame comprising:
a coupler arranged at a first end of the tube segment and that establishes a leakage free coupling with a hose valve,
wherein the coupling system further comprises a remotely controlled drive system comprising at least three separately controlled drivers, of which the first, second, and third drivers simultaneously exert:
a transverse force generating pendulum movements of the coupler in the transverse plane, the transverse plane being defined as a plane oriented transverse the vessel and the vessel's height when the coupling system is assembled to the bow area of the vessel,
a longitudinal force generating pendulum movements of the coupler in a longitudinal plane, the longitudinal plane being defined as the plane oriented longitudinal the vessel and the vessel's height when the coupling system is assembled to the bow area of the vessel, and
a rotational force generating rotational movement of at least part of the coupler, respectively,
wherein the support frame comprises:
two fixing brackets arranged at both transversal sides of the fluid receiving tube segment; and
a shaft arranged between the two fixing brackets and fixed to the tube segment, wherein at least one of the two longitudinal ends of the shaft is pivotally connected to the fixing bracket of the shaft by a second swivel,
wherein the remotely controlled drive system generates the pendulum movements of the coupler in the longitudinal plane by exerting the longitudinal force onto the shaft.

2. The coupling system in accordance with claim 1, wherein the coupling system further comprises:
a first swivel enabling the pendulum movements in the transverse plane;
a second swivel enabling the pendulum movements in the longitudinal plane; and
a third swivel enabling rotational movements of the at least part of the coupler.

3. The coupling system in accordance with claim 1, wherein the shaft is designed such that a recessed portion of the shaft is located further aft relative to the fixing points of the shaft to the fixing brackets when the coupling system is assembled to the bow area of the vessel.

4. The coupling system in accordance with claim 3, wherein the maximum distance between the shaft's fixing points to the fixing brackets and the recessed portion constitutes more than 10% of the transverse distance between the two fixing brackets.

5. The coupling system in accordance with claim 1, wherein the tube segment is designed with at least one elbow or bend.

6. The coupling system in accordance with claim 1, wherein the coupler comprises
at least one coupling claw that releasably couples the coupler to the hose valve after abutment therebetween.

7. The coupling system in accordance claim 6, wherein the coupler further comprises
an at least partly surrounding shield comprising a plurality of radially extending protrusions.

8. A transfer system for transferring hydrocarbons from a hydrocarbon delivery installation to a vessel at open sea, the transfer system comprising:
an elongated vessel;
a coupling system for fluid transfer between a bow area of the elongated vessel and the hydrocarbon delivery installation in accordance with claim 1, the coupling system comprising:

a support frame that suspends the coupling system to the vessel; and
a fluid receiving tube segment fixed to the support frame comprising:
a coupler arranged at a first end of the tube segment and that establishes a leakage free coupling with a hose valve,
wherein the coupling system further comprises a remotely controlled drive system comprising at least three separately controlled drivers, of which the first, second, and third drivers simultaneously exert:
a transverse force generating pendulum movements of the coupler in the transverse plane, the transverse plane being defined as a plane oriented transverse the vessel and the vessel's height when the coupling system is assembled to the bow area of the vessel;
a longitudinal force generating pendulum movements of the coupler in a longitudinal plane, the longitudinal plane being defined as the plane oriented longitudinal the vessel and the vessel's height when the coupling system is assembled to the bow area of the vessel; and
a rotational force generating rotational movement of at least part of the coupler, respectively,
wherein the coupling system being fixed at the lateral extremity of the vessel by the support frame;
a transfer hose extending between the vessel and the hydrocarbon delivery installation during transfer, the transfer hose comprising, at a first end of the transfer hose, a hose valve connectable to the coupler of the coupling system; and
a hose handling rope fixed, at a first end of the hose handling rope, to the hose valve and, at a second end of the hose handling rope, to a pull-in winch on or inside the vessel.

9. The transfer system in accordance with claim 8, wherein the hose handling rope is fixed to the hose valve via a bridle, wherein the two open ends of the bridle are fixed to diametrically opposite sides of the hose valve.

10. The transfer system in accordance with claim 8, wherein the coupling system is arranged at the bow area of the vessel.

11. The transfer system in accordance with claim 8, wherein the support frame comprises:
two fixing brackets arranged at both transversal sides of the fluid receiving tube seen along the longitudinal direction of the vessel; and
a shaft arranged between the two fixing brackets and fixed to the tube segment,
wherein the shaft is designed such that a recessed portion of the shaft is located further aft of the vessel relative to the center position of the shaft's ends to the fixing brackets, the maximum distance between the center position and the recess portion being set in order to allow the transfer hose to be coupled to the coupling system at a lateral angle of more than 100 degrees while avoiding direct impact between the shaft and the hose handling rope at any moment of the coupling procedure that may cause significant wear of the hose handling rope, the lateral angle being defined as the angle from the longitudinal plane to the position of the approaching hose valve.

12. A method of transferring fluid from a fluid source to a vessel at open sea by use of a transfer system in accordance with claim 8,
the method comprising:
connecting a second end of the transfer hose in fluid communication with a fluid source;
closing the hose valve connected to the first end of the transfer hose;
connecting the first end of the hose handling rope to the hose valve;
connecting the second end of the hose handling rope to the pull-in winch through an upper part of the transfer system arranged above the coupler;
pulling the hose valve towards the coupling system by the pull-in winch at least until the hose valve is located above the water line and at a transverse position equal or near the transverse position of the coupler and
simultaneously with pulling the hose valve towards the coupling system, iteratively adjusting the position of the coupler in the transverse plane by a transverse force, in the longitudinal plane by a longitudinal force and the rotational position of the at least part of the coupler by a rotational force, simultaneously, in order to optimize an alignment of the center axis of the coupler with the center axis of the hose valve;
abutting the coupler and the hose valve with their respective axial axes aligned;
activating at least one coupling claw releasably connecting the coupler to the hose valve, establishing leakage free coupling therebetween; and
opening the hose valve for fluid communication.

13. The method in accordance with claim 12, wherein the support frame comprises two fixing brackets arranged at both transversal sides of the fluid receiving tube segment and that the coupling system further comprises a pivotable cylinder oriented parallel to the transverse plane and arranged between the two fixing brackets at a vertical height above the fluid receiving tube segment, wherein the method further comprises iteratively adjusting the longitudinal position of the cylinder around its pivot point by regulating a pivot force acting on the cylinder by the remotely controlled drive system.

14. The method in accordance with claim 13,
wherein the coupling system further comprises a spooling gear arranged near the cylinder and movable in the direction parallel to the cylinder's longitudinal axis, and
wherein the method comprises the steps of guiding at least one of the second end of the hose handling rope and bridle through the spooling gear and iteratively adjusting the transverse position of the spooling gear during the iterative position adjustment of the coupler.

15. A coupling system for fluid transfer between a bow area of an elongated vessel and a hydrocarbon delivery installation at open sea,
the coupling system comprising:
a support frame that suspends the coupling system to the vessel, and
a fluid receiving tube segment fixed to the support frame comprising:
a coupler arranged at a first end of the tube segment and that establishes a leakage free coupling with a hose valve,
wherein the coupling system further comprises a remotely controlled drive system comprising at least three separately controlled drivers, of which the first, second, and third drivers simultaneously exert:
a transverse force generating pendulum movements of the coupler in the transverse plane, the transverse plane being defined as a plane oriented transverse the vessel and the vessel's height when the coupling system is assembled to the bow area of the vessel, a longitudinal force generating pendulum movements of the coupler in a longitudinal plane, the longitudinal plane being defined as the plane oriented longitudinal the vessel and the vessel's height when the coupling system is assembled to the bow area of the vessel, and a rotational force generating rotational movement of at least part of the coupler, respectively, wherein the support frame comprises:

two fixing brackets arranged at both transversal sides of the tube segment and that the coupling system further comprises:

a cylinder arranged between the two fixing brackets at a vertical height above the tube segment when the coupling system is assembled to the bow area of the vessel.

16. The coupling system in accordance with claim 15, wherein the cylinder is pivotably coupled to the two fixing brackets, the pivot movements being generated by exerting a fourth remotely controlled force onto the cylinder by the drive system.

17. The coupling system in accordance with claim 15, wherein the coupling system further comprises a spooling gear arranged in proximity of the cylinder, the spooling gear being movable in the direction parallel to the cylinder's longitudinal axis.

* * * * *